A. N. CROSS.
ARTIFICIAL TOOTH.
APPLICATION FILED FEB. 1, 1917.
1,234,139.
Patented July 24, 1917.
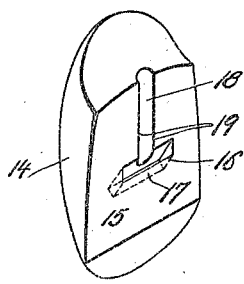
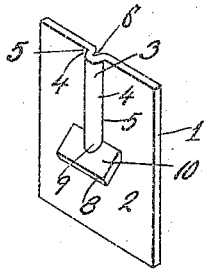
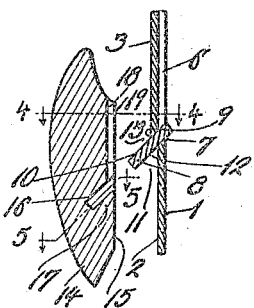
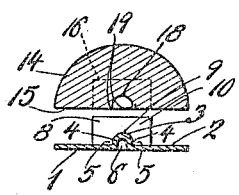
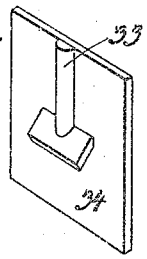
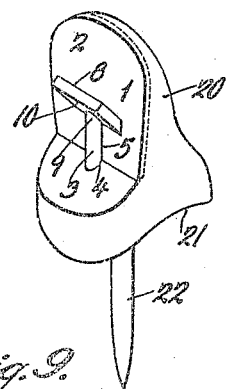
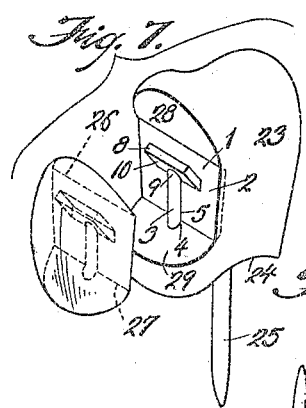
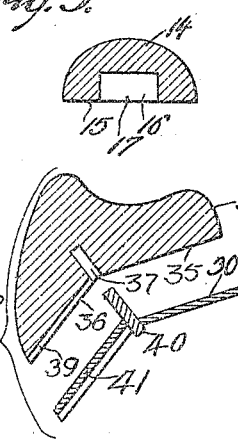
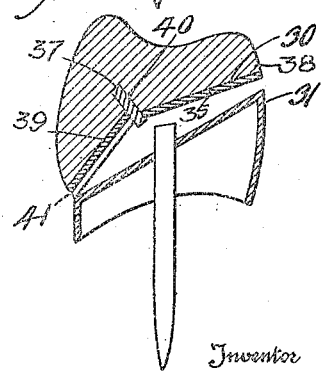
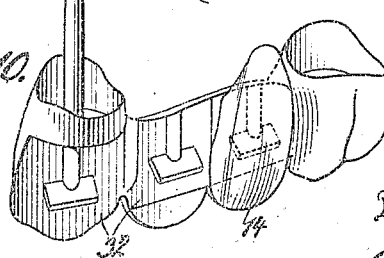
Inventor
Arthur N. Cross.

UNITED STATES PATENT OFFICE.

ARTHUR N. CROSS, OF PHILADELPHIA, PENNSYLVANIA.

ARTIFICIAL TOOTH.

1,234,139.  Specification of Letters Patent.  Patented July 24, 1917.

Application filed February 1, 1917.  Serial No. 145,838.

*To all whom it may concern:*

Be it known that I, ARTHUR N. CROSS, a citizen of the United States, residing at Philadelphia, in the county of Philadelphia and State of Pennsylvania, have invented certain new and useful Improvements in Artificial Teeth, of which the following is a specification.

My invention consists of improvements in artificial teeth and has for one of its objects a construction whereby a porcelain or other tooth facing can be securely held in place.

Another object is to so construct my invention that the tooth facing so held will be strong and durable.

A still further object is to so construct my invention that it will be adaptable to form teeth of various shapes and can also be used with advantage in the production of caps and bridges.

Another object is to so design my invention that it can be quickly and easily manufactured and assembled.

These objects, and other advantageous ends which will be described hereinafter, I attain in the following manner, reference being had to the accompanying drawings in which—

Figure 1 is a perspective view of a tooth facing constructed in accordance with my invention.

Fig. 2 is a perspective view of a backing plate which forms a part of my invention.

Fig. 3 is a sectional elevation of the tooth facing and backing plate shown in Figs. 1 and 2 in their relative positions prior to being secured one to the other.

Fig. 4 is a sectional plan view taken on the line 4—4 of Fig. 3.

Fig. 5 is a sectional view through the tooth facing and taken on the line 5—5 of Fig. 3.

Fig. 6 is a perspective view showing my improved backing plate shaped and fitted to a Richmond cap and ready to receive the tooth facing. The tooth so formed performs the function of a cuspid tooth.

Fig. 7 is a detached perspective view of a bicuspid tooth constructed in accordance with my invention, the tooth facing being shown in position ready to be attached to the backing plate.

Fig. 8 is a detached sectional view showing my improved backing plate having portions arranged at an angle to fit a porcelain cuspid tooth.

Fig. 9 is a sectional view showing the backing and porcelain cuspid of Fig. 8 joined together and positioned to be soldered to a Richmond cap.

Fig. 10 shows a perspective view of one form of bridge constructed in accordance with my invention, and Fig. 11 shows a modified form of my improved backing plate.

Referring to Figs. 1 to 5 inclusive, my improved backing plate 1 is preferably made of metal and has a plane surface 2. This plate throughout a portion of its length, has a longitudinally extending rib 3 which is half round in cross section or slightly greater than half round in order to provide shoulders 4 which sharply intersect the face 2, and provide angular recesses 5 (see Figs. 2 and 4).

This rib 3, as illustrated in Figs. 2, 3, and 4, is formed by pressing a groove 6 in the rear face of the backing 2, and thereby causing said rib to project in the manner illustrated. The backing plate 1 is also slotted at 7, said slot extending transversely to the rib 3 and directly adjacent the inner end of said rib. The longitudinal section of said slot is rectangular, but the transverse section of said slot extends at an incline to the face 2.

A rectangular tongue or bar 8 extends through said slot 7 and consequently extends at an incline to the face 2 and away from said rib, the intersection being such that the inner end 9 of said rib intersects the surface 10 of said tongue 8.

The tongue 8 is preferably brazed or otherwise secured in the above noted position, and forms an acute angle 11 between its lower face 12 and the face 2 of the plate 1. On the other hand, the surface 10 of the tongue 8 forms an obtuse angle 13 with the surface 2 of said backing plate 1.

The tooth facing 14 illustrated in Figs. 1, 3, 4, and 5, is preferably made of porcelain or other white material, and has a ground rear surface 15 which is designed to fit against the plane surface 2 of the backing 1.

Starting at the rear surface 15, the facing 14 has an angular cavity 16 projecting therein at an incline. This incline extends at the same angle to the surface 15 as does the tongue 8 to the face 2, and is designed to receive the tongue 8. The cavity 16 thus formed provides a portion 17 in the tooth facing 14, which fits within the acute angular space 11 above referred to. The flat rear surface 15 of the tooth facing is also grooved at 18 and the cross section of this groove has a contour similar to the contour of the rib 3. The groove 18 thus formed provides angular projections 19 which fit within the recesses 5 and abut the shoulders 4 when the facing is attached to the backing plate 1.

Fig. 6 shows the backing plate 1 after it has been soldered or brazed to the body portion 20 of a cuspid tooth, the said body portion being preferably made of gold or other metal and is connected to a Richmond cap 21 having a securing post 22 of the usual form.

Fig. 7 shows the backing plate 1 brazed or otherwise secured to the body portion 23 which may be made of gold or other metal and also includes a Richmond cap 24 provided with the usual securing post 25. In this instance, the tooth facing has angular portions 26 and 27 designed to fit angular portions 28 and 29 respectively, of the body portion 23.

Fig. 8 shows a form of my invention in which a backing plate 30 is bent at an angle to engage the angularly disposed flat surfaces 35 and 36, and a cavity 37 is formed within the tooth facing 38, said cavity leading inwardly from the junction of said surfaces 35 and 36. The surface 36 has a groove 39 formed therein which extends toward the cavity 37 as described above in connection with the groove 18. The plate 30 has a tongue 40 which projects outwardly therefrom at the bend of said plate. The plate 30 also has a rib 41 which extends toward and intersects the tongue 40, said rib being designed to fit within the groove 39.

Fig. 9 shows the backing plate 30 bent at an angle and in position to be soldered to a Richmond cap 31. Fig. 10 shows a bridge including the backing plates 32 which are embedded within the metal forming the bridge, and tooth facings similar to that above described can be secured thereto.

In Fig. 11, instead of forming a rib on the backing plate by grooving the rear face of the latter, as in Fig. 2, I produce the rib 33 by brazing a half round rod to the front face 34 of said backing plate. In all other respects the construction is similar to that described in connection with the backing plate 1, and I have therefore given similar parts corresponding reference numerals.

By constructing a tooth as above described, I prevent lateral or twisting movement of the tooth facing relatively to the backing, since it will be noted that while the angular tongue serves to prevent any longitudinal movement of the tooth facing, the rib and groove construction will effectively prevent any lateral or twisting movement of the tooth facing relatively to the backing, since the shoulders which are formed by said rib resist any lateral pressure which is imparted to the tooth facing, and it will be further noted that the tooth facing when in use is cemented to the backing.

By having the tongue 8 extending transversely to the rib on the backing plate, the tongue also serves to prevent any relative lateral movement between the facing and the backing, and the resisting power of the tongue is balanced with regard to the rib on said backing plate for the reason that the tongue projects at either side of the rib and thereby provides a T-shaped projection in which the head of the T is the tongue 8. Also, the angular disposition of the tongue 8 provides a pocket, above mentioned as the acute angular space 11, so that any longitudinal pressure which is brought to bear upon the tooth facing, will cause said tooth facing to direct that pressure toward the backing plate and thereby firmly press the facing to said plate.

In the use of my invention, all of the coacting parts can be made to a standard so that the parts will be interchangeable one with the other.

It will be further understood that in my invention the tooth facings may also be made interchangeable and ground to a standard on all surfaces which come in contact with any metal, such for example as the body portions 20 and 23 above referred to, and also the front face of the backing plate, and the fact that these surfaces are ground, causes the cement to adhere to the porcelain tooth facing.

Another of the advantageous features of my invention is that it requires but a small amount of the porcelain to be cut away and the tooth facing made in accordance with my invention is thereby strong, durable, and not subject to fracture.

The backing plate can be readily shaped to suit the requirements of the body portion of the tooth to which it is attached, and in the finished tooth the division between the backing plate and the body portion of the tooth is invisible.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. An artificial tooth including a backing having a tongue of elongated cross section projecting from one face thereof and a rib projecting from said face and intersecting said face and tongue, and a tooth facing having a cavity and a groove into which the tongue and rib of the backing respectively fit, substantially as described.

2. An artificial tooth including a backing having a projecting tongue extending at an incline to one face thereof and a rib intersecting said tongue, and a tooth facing having a cavity and a groove into which the tongue and rib of the backing respectively fit, substantially as described.

3. An artificial tooth including a backing having a projecting tongue extending at an incline to one face thereof and a rib formed on said face, said rib extending transversely to said tongue, and a tooth facing having a cavity and a groove into which the tongue and rib of the backing respectively fit, substantially as described.

4. An artificial tooth including a backing having a plane surface and a tongue projecting from said surface at an incline, a rib projecting from said surface and being of less width than the width of the tongue, said rib intersecting said tongue intermediate of the lateral edges of said tongue, and a tooth facing having a flat ground surface designed to fit against the plane surface of the backing and having a cavity and a groove ground within said flat surface and into which the tongue and rib respectively fit, substantially as described.

5. A tooth facing having a cavity extending at an incline to an outer surface of the facing, said cavity being angular in cross section, a backing, and means projecting from said backing and designed to extend within said cavity, substantially as described.

In testimony whereof I have signed my name to this specification in the presence of two subscribing witnesses.

ARTHUR N. CROSS.

Witnesses:
MARY J. O'DONNELL,
CHAS. E. POTTS.

Copies of this patent may be obtained for five cents each, by addressing the "Commissioner of Patents, Washington, D. C."